Figure 5:
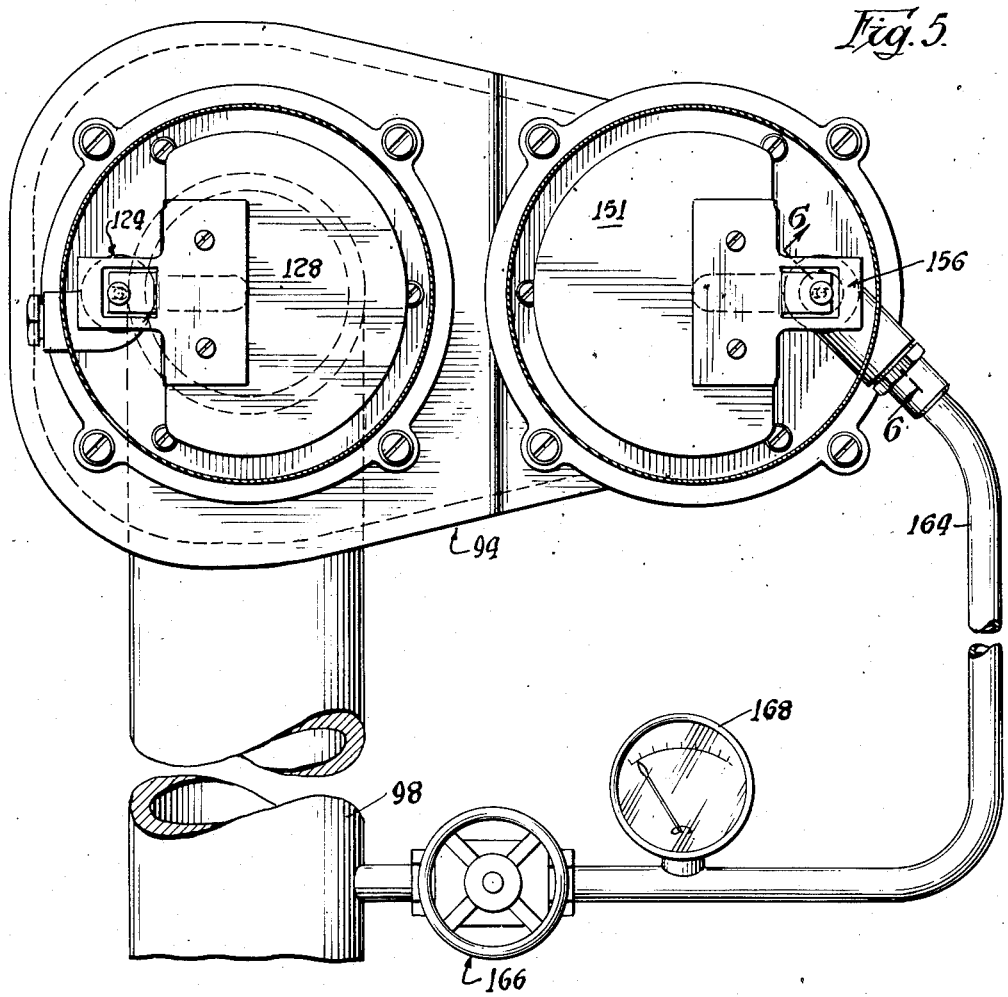

June 12, 1956  J. K. MOSHER  2,749,936
FLUID PRESSURE ACTUATED VALVE
Filed Sept. 20, 1950  3 Sheets-Sheet 1
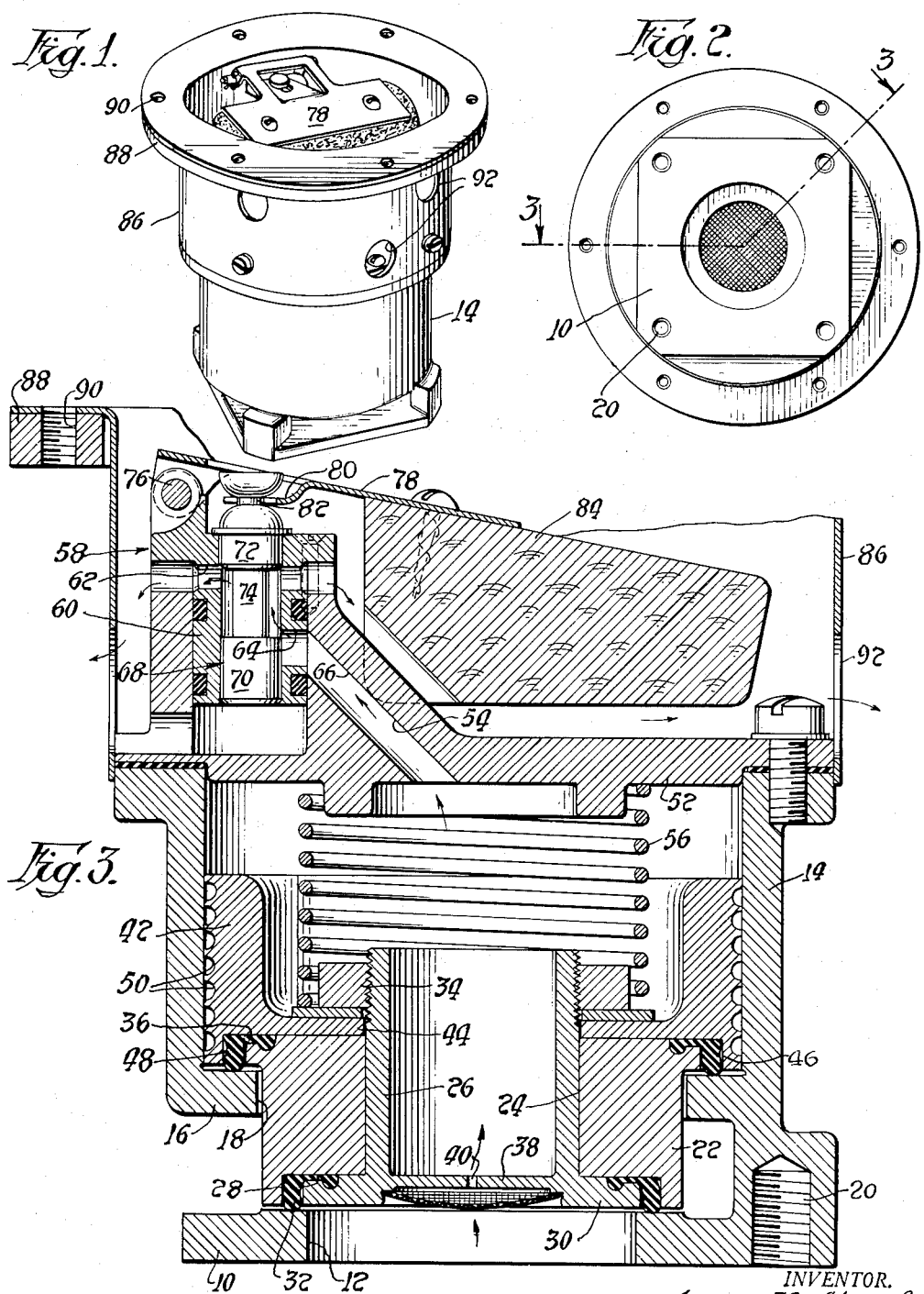
INVENTOR.
James K. Mosher,
BY Wilfred E. Lawson
Attorney.

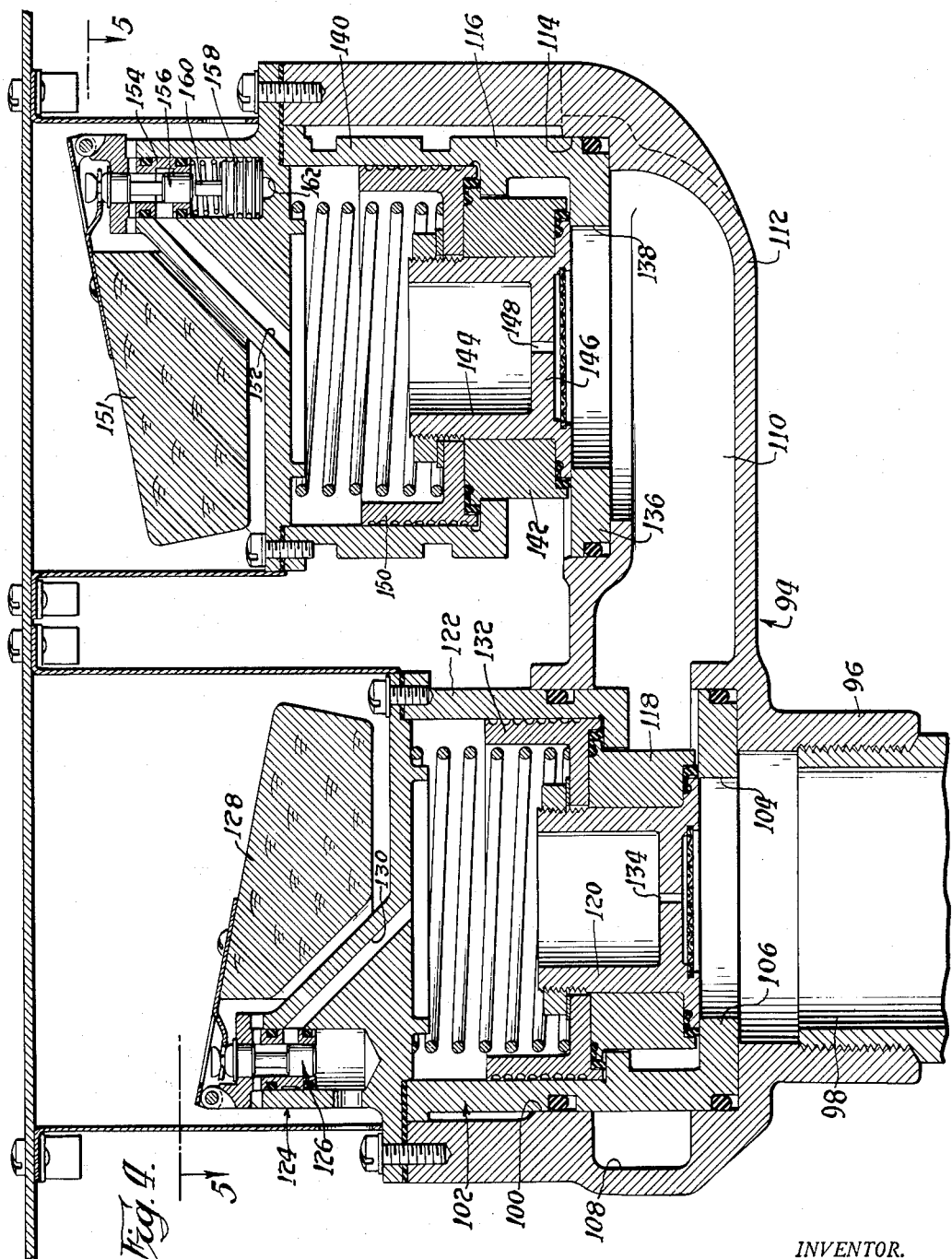

June 12, 1956 J. K. MOSHER 2,749,936
FLUID PRESSURE ACTUATED VALVE
Filed Sept. 20, 1950 3 Sheets-Sheet 3

INVENTOR.
James K. Mosher,
BY Wilfred E. Lawson
Attorney

United States Patent Office 2,749,936
Patented June 12, 1956

2,749,936

FLUID PRESSURE ACTUATED VALVE

James K. Mosher, Pasadena, Calif., assignor to Schulz Tool and Manufacturing Co., San Gabriel, Calif., a corporation of California Application September 20, 1950, Serial No. 185,839

12 Claims. (Cl. 137—413)

This invention relates to a fluid pressure actuated valve and more particularly to a valve of the type employed for controlling the fluid level in a tank.

The primary object of this invention is to maintain substantially constant the level of fluid in a tank and to supply fluid to the tank as the level of the fluid in the tank falls below a predetermined point.

Another object is to discontinue the supply of fluid to the tank when it has attained a desired level therein.

A further object is to employ the pressure of the fluid to open and close the valve in accordance with the requirements and thereby automatically maintain the fluid in the tank at a minimum and maximum level.

Still another object is to assure positive action in both the opening and closing of the valve and to enable the user to determine whether or not the valve is functioning properly.

A further and more specific object is to so construct the working parts of the valve as to reduce to a minimum the friction of these parts against the stationary parts and further to trap foreign matters such as grit and the like in such a manner as to avoid scoring or mutilating the working parts.

Valves of the type to which this invention relates are commonly employed in maintaining the level of fuel in a fuel tank substantially constant and one of the major considerations in the construction of such a valve is the maintenance of freedom of movement of the working parts thereof so as to assure positive action of the valve, hence one of the features of the invention resides in maintaining the working parts out of contact with the stationary parts and at the same time afford adequate sealing between the valve and its seat so as to avoid leakage of the fuel past the valve when it is closed.

Other features include a valve seat having a flow passage extending therethrough, a valve mounted adjacent one side of the seat for movement toward and away from the seat and in opening and closing relation to the flow passage, a piston mounted to move toward and away from the valve seat and connected with the valve for moving said valve to closed position against the effort of fluid flowing through the flow passage, means to admit to the cylinder behind the piston fluid from the flow passage, a fluid discharge port extending through the cylinder behind the piston and a pilot valve carried by the cylinder and operative to close the port.

Other features include a float connected to the pilot valve and operable to move said pilot valve to closed position when the fluid in the tank attains a predetermined level.

Figure 6:
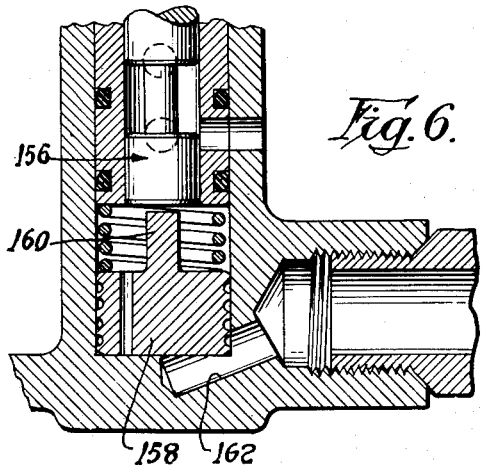

In the drawings:

Figure 1 is a perspective view of a valve embodying the features of this invention, Figure 2 is a bottom plan view of the valve illustrated in Figure 1, Figure 3 is an enlarged vertical sectional view taken substantially along the line 3—3 of Figure 2, Figure 4 is an enlarged vertical section through another form of the invention illustrating a structure by which a test may be made to determine whether the valve is in working order, Figure 5 is a horizontal sectional view taken substantially along the line of 5—5 of Figure 4, and Figure 6 is an enlarged fragmentary sectional view taken substantially along the line 6—6 of Figure 5.

Referring to the drawings in detail the valve seat 10 has extending therethrough a flow passage 12, and in the preferred form of the invention the valve seat 10 carries in axial alignment with the flow passage 12 a cylinder 14 carrying at its end adjacent the flow passage an inturned flange 16 to form an opening 18 which aligns axially with the flow passage 12. The side of the seat 10 remote from the cylinder 14 is drilled and tapped as at 20 to receive coupling bolts or screws by which a fluid supply line (not shown) is coupled to the seat 10. Mounted for movement in the opening 18 formed by the flange 16 of the cylinder 14 is a valve 22 having an enlarged opening 24 extending therethrough for the reception of a bushing 26. The end of the passage 24 adjacent the valve seat 10 opens into an enlarged annular recess 28, and carried on the end of the bushing 26 adjacent the seat 10 is an outstanding annular flange 30 which is received in the recess 28 with its peripheral edge in spaced relation to the periphery of the space 28 to form an annular recess for the reception of an annular band 32 of packing material, the lower edge of which projects slightly beyond the end of the piston 42 to engage the seat 10 when the valve 22 is in closed position. The end of the bushing 26 remote from the flange 30 projects beyond the end of the valve 22 remote from the seat 10 and is externally screw threaded for cooperation with a coupling nut 34 by which the piston, to be more fully hereinafter described, is connected to the valve 22. As illustrated in Figure 3, the valve 22 projects into the cylinder 14 and is provided adjacent its end remote from the seat 10 with an outstanding annular flange 36 and the bushing 26 is provided adjacent its end carrying the flange 30 with an end wall 38 which is formed axially with a relatively small orifice 40 by which fluid entering the flow passage 12 is conducted into the cylinder 14.

Mounted for free sliding movement in the cylinder 14 is a piston 42 carrying at its end adjacent the seat 10 and flange 16 a head 44 having an annular space 46 for the reception of the flange 36 of the valve 22. As illustrated the inner peripheral wall of the chamber 46 is spaced from the periphery of the flange 36 to receive an annular packing ring 48 which extends slightly beyond the end of the piston 42 and side of the flange 36 adjacent the flange 16 so that when the valve 22 is in closed position, the packing or seal 48 will form an effective seal against the flange 16, and at the same time metal to metal contact will be avoided between the seat 10, the valve 22, the flange 16 and the piston 42. Likewise it is to be noted that the opening 18 is of slightly larger diameter than the diameter of the valve 22 in order to avoid metal to metal contact and assure freedom of movement of the valve. The diameter of the piston 42 is also such as to freely slide within the cylinder 14, and in order to avoid scoring or mutilation of the walls of the cylinder 14 and the piston 42 by the accumulation of grit between them, the piston is provided with longitudinally spaced annular grooves 50 in which grit particles may collect and thus avoid damage to the working parts.

The annular grooves 50 define spaced lands therebetween, and present a combined relatively short axial sliding contact between the piston 42 and the cylinder 14 to thus substantially reduce the restraining friction therebetween and permit operation of the valve device by utilization of fluid pressures far below those normally required. Additionally, the grooves 50 provide grit collection areas and, in the case of grit particles that may be harder than the metal piston 42, metallic chips that may be cut from the peripheral surface of the lands, are merely allowed to roll over into the grooves 50 rather than traverse the entire axial length of the piston to cause an enlargement thereof and associated seizure within the cylinder 14 and consequent failure of the mechanism. Movement of grit particles across the lands is occasioned by a slight leakage of fluid thereby.

The end of the cylinder 14 remote from the valve seat 10 is closed by a head 52 having formed therein a fluid discharge port 54 of considerably greater capacity than the orifice 40 in the wall 38 of the bushing 26. It will thus be seen that fluid flowing through the flow passage 12 and passage 40 into the cylinder 14 may escape through the port 54 without building up pressure within the cylinder. A relatively light coil spring 56 is interposed between the head 52 of the cylinder 14 and the head 44 of the piston 42 to urge the valve 22 toward the seat 10 and thus maintain the flow passage closed so long as any fluid pressure remains in the cylinder 14 behind the piston 42.

In order to regulate the building up of fluid pressure within the cylinder 14, I provide a float valve designated generally 58 which, while being shown as a part of the head 52, obviously may be made a separate element and coupled to the port 54 through any suitable conduit. In the preferred form of the invention however the valve 58 comprises a cylinder 60 which is carried by the head 52 adjacent one side thereof and is provided adjacent one end with a discharge opening 62 and intermediate its ends with an inlet opening 64 which is connected to the discharge port 54 by a conduit 66. Mounted for sliding movement in the cylinder 60 is a slide valve designated generally 68 carrying adjacent one end a land 70 and adjacent its opposite end a land 72. These lands 70 and 72 are joined by a neck 74 which when the valve is in open position permits the flow of fluid from the port 64 through the port 62, but when the valve closes, moves the land 70 into closing relation with the port 64 and thus discontinues the flow of fluid through the ports 62 and 64.

Pivotally mounted as at 76 adjacent the cylinder 60 is an arm 78 carrying a fork 80 which is received in a groove 82 in the valve 68 adjacent its end remote from the land 70. A float 84 is connected to the arm 78 in such a manner that the arm 78 will be moved upwardly about its pivot upon upward movement of the float to move the valve 68 in the cylinder 60 and bring the land 70 into closing relation with the port 64. When the float 84 moves in the oppoiste direction, the valve 68 will be moved downwardly in the cylinder 60 so as to cause the land 70 to uncover the port 64.

A cage 86 is preferably carried by the head 52 and surrounds the float 84 and valve 58. This cage is provided adjacent its upper end with an annular outstanding flange carrying an attaching ring 88 which is provided with annularly spaced screw threaded openings for the reception of screw 90 by which the entire unit may be suspended from the top of a conventional fuel tank. The cage 86 is also provided at spaced intervals with openings 92 which communicate with the interior of the fuel tank in order to permit fuel therein to enter the cage 86 and actuate the float 84.

As previously explained, the float valve 58 may be formed as a separate unit from the head 52 and connected to the port 54 by any suitable conduit 66.

In the modified form of the invention illustrated in Figures 4 through 6 inclusive, a fitting designated generally 94 is provided with a coupling collar 96 by means of which a fuel supply line 98 is connected to the fitting 94. This fitting 94 is provided in axial alignment with the collar 96 with a bore 100 for the reception of a valve unit designated generally 102 of the type previously described.

The fitting 94 is provided adjacent the discharge end of the flow passage 104 in the valve seat 106 of the unit 102, with an annular passage 108 which opens into a chamber 110 formed in an arm 112 which extends laterally from the collar 96 and is provided adjacent its outer end with an annular seat 114 for the reception of a valve unit designated generally 116.

The valve unit 102 is equipped with a valve 118 which corresponds to the valve 22 previously described, a bushing 120 which corresponds to the bushing 26 previously described, a cylinder 122 which corresponds to the cylinder 14 previously described and a float valve designated generally 124 corresponding to the valve unit 58 previously described. A slide valve 126 like the slide valve 68 is controlled by a float 128 so that when the float is in its lowermost position communication will be established through the medium of a conduit 130 between the cylinder 122 and the tank in which the valve 102 is located.

It will thus be seen that fluid entering the cylinder 122 behind the piston 132 through the orifice 134 in the bushing 120 will be drained into the fuel tank through the conduit 130 and valve 124. However when the float 128 is elevated, the slide valve 126 will be moved to close the conduit 130 so that fluid entering the cylinder 122 through the passage 134 will cause the piston 132 to move the valve 118 into closed position with relation to the seat 106 and thereby close the flow passage 104.

Owing to the fact that the valve 102 may for various reasons become inoperative I have found it desirable to arrange to test the operation thereof and accordingly employ the auxiliary valve 116 through which fluid passing through the flow passage 104 must pass before it enters the fuel tank. Accordingly the valve 116 like the valves previously mentioned is provided with a valve seat 136 having a flow passage 138 extending therethrough which communicates at one end with the chamber 110 and at its opposite end with the interior of the fuel tank. A cylinder 140 corresponding to the cylinder 122 and the cylinder 14 previously described is carried by the valve seat 136 in axial alignment with the flow passage 138 and mounted for sliding movement through the end of the cylinder adjacent the valve seat 136 is a valve 142 which when advanced toward the flow passage closes said passage.

Like the valves previously described, the valve 142 is equipped with a bushing 144 having a head 146 at the end thereof adjacent the valve seat 136 which head is provided with a relatively small orifice 148 which establishes restricted communication between the flow passage 138 and the cylinder 140 behind a piston 150 which is mounted in the cylinder 140 and is coupled to the valve 142. Like the cylinders 14 and 122 previously referred to, the cylinder 140 is equipped with a relatively large discharge port 152, the opening and closing of which is governed by a float actuated slide valve 154 contained in a valve body designated generally 156 which corresponds to the valve bodies 68 and 126 previously referred to. The movements of the valve 154 are normally controlled by a float 151 in a manner similar to the valve bodies 68 and 126 previously referred to. It is to be noted that the float 151 and the valve 116 are respectively at a higher level than the float 128 and the valve body 122 so that should the valve 102 fail to operate to close the flow passage 104 when the fuel going into the tank attains a predetermined level, the valve 116 will operate to shut off the fuel flow.

A plunger 158 is mounted beneath the body 154 of the valve 156 and carries a stem 160 which is adapted to engage the valve 156 to move it upwardly so as to close the port 152. A conduit 162 (Fig. 6) opens beneath the plunger 158 for admitting fluid under pressure beneath the plunger 158 and cause it to move upwardly. This conduit is connected by a pipe line 164 through a valve 166 to the fuel supply pipe 98, and coupled in the pipe 164 between the valve 166 and the conduit 162 is a pressure gauge 168. It will thus be seen that by opening the valve 166, fluid will flow from the fuel supply pipe 98 through the pipe 164 and into the conduit 162 so as to exert upward pressure on the plunger 158 and move the stem 160 thereof into contact with the valve 156 so as to move it upwardly and thereby close the port 152 of the valve 116.

Fluid entering the flow passage 12 under pressure will tend to lift the valve 22 off of the seat 10, but so long as the port 54 in the head 52 of the cylinder remains closed, the fluid passing through the orifice 40 will enter the cylinder 14 behind the piston 42 and owing to the fact that the area of piston is greater than the area of the surface of the valve 22 exposed to the fluid, the valve 22 will remain seated on the seat 10 and in closing relation with the flow passage 12. When the fluid level in the fuel tank falls below a predetermined value, the float 84 will move downwardly about its pivot 76 thus moving the slide valve 68 downwardly and opening the port 64 so as to establish a flow of fluid through the port 54, conduit 66 and port 64 out through the valve 58 and into the fuel tank. As soon as the level in the tank attains a predetermined value, the float 84 will move upwardly causing the plunger 68 of the valve 58 to close the port 64 and hence shut off the flow of fluid through the conduit 66 and port 54, thus building pressure in the cylinder 14 behind the piston 42. As the pressure builds up within the cylinder, the piston 42 will move downwardly causing the valve 22 to move against the pressure of the fluid in the flow passage 12 until the seals 32 and 48 engage the seat 10 and flange 16 respectively at which time the passage of fluid through the flow passage 12 will be arrested. As the fuel in the tank is withdrawn therefrom, it is evident that the float 84 will again fall until such time as the slide valve 68 opens the port 64 in the valve 22 when the cycle will be repeated. In this way positive seating of the valve 22 on its seat 10 is assured as the pressure of the fuel is employed against the piston 42 to seat the valve.

When the device illustrated in Figures 4 through 6 is employed, it is evident that the fluid pressure will also seat the valves 118 and 142, but that should either or both of said valves 118 or 142 fail to operate under normal circumstances, the valve 166 may be opened to cause the plunger 158 to move the pilot valve 156 to closed position and thereby cause fluid pressure to be built up behind the piston 150 so as to move the valve 142 to closed position. This manual control provides a safety factor.

While in the foregoing there has been shown and described the preferred form of this invention, it is to be understood that minor changes in the details of construction, combination and arrangement of parts may be resorted to without departing from the spirit and scope of the invention as claimed.

I claim:

1. A fluid pressure actuated valve of the character stated comprising a flat body forming a valve seat having a flow passage therethrough, a cylinder spaced from and connected with said body with one open end directed toward the body, an inwardly directed sealing flange in said cylinder end forming an opening coaxial with and of larger diameter than said flow passage, a head closing the other end of the cylinder, a cylindrical valve body disposed within said opening and having one end partially disposed within the cylinder, a radially outwardly extending flange encircling said one end of the valve body and positioned in the cylinder in overlapping relation to said sealing flange, a first annular packing carried by the valve body flange for contact with the sealing flange, a second annular sealing packing associated with the other end of the valve body for engaging said valve seat around the flow opening, a piston secured to the radially outwardly extending flanged end of the valve body and slidable in said cylinder, a spring within the cylinder between the piston and cylinder head, means forming a passageway providing communication thru said valve body to said cylinder, a discharge port leading from the cylinder through said head, a valve unit controlling fluid flow through the discharge port from the cylinder, and a pivoted float operatively coupled with said valve unit for effecting opening of the same upon movement of the float in one direction.

2. The invention as set forth in claim 1, wherein the said other end of the valve body has a circular recess therein in which said second annular sealing packing is positioned, the valve body having an axial passage therein opening into said circular recess, and the securing means between the piston and the valve body comprising a tubular bushing extending through said axial passage of the valve and having a flange on the end remote from the piston, said bushing flange lying in said circular recess and securing the sealing packing therein, the other end of said bushing being externally screw threaded and having a securing nut threaded thereon and in binding contact with the piston.

3. The invention as set forth in claim 1, wherein said piston is provided in its outer wall with a plurality of spaced annular grooves facing the inner wall of the cylinder for trapping grit particles.

4. The invention as set forth in claim 1, wherein said piston has a circular recess formed in the end thereof which is adjacent to the said inwardly directed sealing flange, the said one end of the valve body being disposed within the recess in the end of the piston, and the said packing carried by the valve body flange being disposed between the periphery of the valve body flange and the outer wall of the piston recess and having a portion compressed in the piston recess against the bottom thereof by the said one end of the valve body.

5. A fluid pressure actuated valve of the character stated comprising a flat body forming a valve seat having a flow passage therethrough, a cylinder spaced from and connected with said body with one open end directed toward the body, an inwardly directed sealing flange in said cylinder end forming an opening coaxial with and of larger diameter than said flow passage, a head closing the other end of the cylinder, a cylindrical valve body disposed within said opening and having one end partially disposed within the cylinder, a radially outwardly extending flange encircling said one end of the valve body and positioned in the cylinder in overlapping relation to said sealing flange, a first annular packing carried by the valve body flange for contact with the sealing flange, a second annular sealing packing associated with the other end of the valve body for engaging said valve seat around the flow opening, a piston secured to the radially outwardly extending flanged end of the valve body and slidable in said cylinder, a spring within the cylinder between the piston and cylinder head, means forming a passageway providing communication thru said valve body to said cylinder, said cylinder head having a cylindrical chamber formed therein with its axis paralleling the axis of the cylinder, a tubular cylinder fitted in said cylindrical chamber and having laterally opening ports, a discharge port leading from the first cylinder into the cylindrical chamber, a slide valve within the tubular cylinder and having a constriction intermediate its ends with the portions at the two ends of the constriction fitting snugly in the tubular cylinder, one of said portions being adapted to close said discharge port upon the movement of the slide valve in one direction, the slide valve when moved in the opposite direction establishing communication between said discharge port and the laterally opening port, a pivoted arm adjacent to the outer end of the slide valve, and a float member connected with said arm.

6. A fluid pressure actuated flow control valve comprising, in combination: a valve body; a valve, an annular valve seat associated with said valve; a cylindrical bore formed in said valve body; a piston positioned for slidable movement within said cylindrical bore; a bushing disposed axially through said valve and said piston; a pair of annular sealing members positioned intermediate said piston and said valve and intermediate said valve and said bushing respectively, said sealing members being adapted for engagement with said valve body and said valve seat respectively; and means associated with said bushing for securing said piston in engagement with said valve and retaining said pair of annular sealing members in position.

7. A fluid pressure actuated flow control valve comprising, in combination: a valve body; a valve; an annular valve seat associated with said valve; a cylindrical bore formed in said valve body; a piston positioned for slidable movement within said cylindrical bore; a bushing disposed axially through said valve and said piston; a pair of annular sealing members positioned intermediate said piston and said valve and intermediate said valve and said bushing, respectively, said sealing members being adapted for engagement with said valve body and said valve seat, respectively; and a plurality of spaced annular grooves formed in the periphery of said piston, said grooves defining spaced lands therebetween and being adapted for the reception of grit and metallic particles.

8. A fluid pressure actuated flow control valve comprising, in combination: a valve; an annular valve seat associated with said valve; a cylindrical bore formed in said valve body; a piston positioned for slidable movement within said cylindrical bore; a bushing disposed axially through said valve and said piston; a pair of annular sealing members positioned intermediate said piston and said valve and intermediate said valve and said bushing respectively, said sealing members being adapted for engagement with said valve body and said valve seat, respectively; a chamber formed intermediate said valve body and a side of said piston remote from said valve; a float operated pilot valve; an orifice formed in said bushing for the admission of fluid under pressure to said chamber; and an unrestricted passage interconnecting said pilot valve and said chamber, to vent said chamber to a region of lower pressure.

9. A fluid pressure actuated flow control valve comprising, in combination: a valve body; a valve; an annular valve seat associated with said valve; a cylindrical bore formed in said valve body; a piston positioned for slidable movement within said cylindrical bore; a bushing disposed axially through said valve and said piston; a pair of annular sealing members positioned intermediate said piston and said valve and intermediate said valve and said bushing, respectively, said sealing members being adapted for engagement with said valve body and said valve seat, respectively; means associated with said bushing for securing said piston in engagement with said valve and retaining said pair of annular sealing members in position; a plurality of spaced annular grooves formed on the periphery of said piston, said grooves defining spaced lands therebetween and being adapted for the reception of grit and metallic particles; a chamber formed intermediate said valve body and a side of said piston remote from said valve; an orifice formed in said bushing for the admission of fluid under pressure to said chamber; and an unrestricted passage interconnecting said pilot valve and said chamber, to vent said chamber to a region of lower pressure.

10. A fluid pressure actuated flow control valve comprising, in combination: a valve body; a valve; an annular valve seat associated with said valve; a cylindrical bore formed in said valve body; a piston positioned for slidable movement within said cylindrical bore; a bushing disposed axially through said valve and said piston; a pair of annular sealing members positioned intermediate said piston and said valve and intermediate said valve and said bushing, respectively, said sealing members being adapted for engagement with said valve body and said valve seat, respectively; means associated with said bushing for securing said piston in engagement with said valve and retaining said pair of annular sealing members in postion; a plurality of spaced annular grooves formed on the periphery of said piston, said grooves defining spaced lands therebetween and being adapted for the reception of grit and metallic particles; a chamber formed intermediate said valve body and a side of said piston remote from said valve; a float operated pilot valve; an orifice formed in said bushing for the admission of fluid under pressure to said chamber; an unrestricted passage interconnecting said pilot valve and said chamber whereby, upon operation of said pilot valve, to vent said chamber to a region of lower pressure; and spring means normally biasing said pair of sealing members into engagement with said valve body and valve seat, respectively.

11. A pressure actuated fluid flow control valve mechanism comprising: a valve body; a fluid inlet to said valve body; a fluid outlet from said valve body; a pair of valve members arranged in series intermediate said fluid inlet and said fluid outlet and adapted to normally prevent fluid flow through said valve mechanism; float operated pilot valves associated with and adapted to control pressures acting upon said valve members; and means associated with one of said pilot valves for operating it independently of fluid level.

12. A pressure actuated fluid flow control valve mechanism comprising: a valve body; a fluid inlet to said valve body; a fluid outlet from said valve body; a pair of valve members arranged in series intermediate said fluid inlet and said fluid outlet and adapted to normally prevent fluid flow through said valve mechanism; fluid level float operated pilot valves associated with and adapted to control pressures acting upon said valve members; and fluid operated, remote controlled means associated with said pilot valve associated with said valve member downstream in said mechanism for operating said pilot valve.

References Cited in the file of this patent

UNITED STATES PATENTS

| Number | Name | Date |
|---|---|---|
| 457,005 | McNeil | Aug. 4, 1891 |
| 629,789 | Honiball | Aug. 1, 1899 |
| 1,017,178 | Selin | Feb. 13, 1912 |
| 1,818,053 | Elger | Aug. 11, 1931 |
| 1,965,307 | Darling | July 3, 1934 |
| 2,037,540 | Rohlin et al. | Apr. 14, 1936 |
| 2,477,186 | Koehler | July 26, 1949 |
| 2,528,499 | Davies | Nov. 7, 1950 |
| 2,548,354 | Davies | Apr. 10, 1951 |
| 2,616,450 | Legge et al. | Nov. 4, 1952 |
| 2,619,108 | Sweeney | Nov. 25, 1952 |
| 2,698,631 | Bashark | Jan. 4, 1955 |
| 2,699,316 | Mosher | Jan. 11, 1955 |